United States Patent
Jaccard et al.

(10) Patent No.: US 12,006,919 B2
(45) Date of Patent: Jun. 11, 2024

(54) ENERGY HARVESTING WITH FLUIDS

(71) Applicant: Preciflex SA, Neuchâtel (CH)

(72) Inventors: Alain Jaccard, Ste-Croix (CH); Johann Rohner, Pomy (CH); Luc Maffli, Fribourg (CH)

(*) Notice: Subject to any disclaimer, the term of this patent is extended or adjusted under 35 U.S.C. 154(b) by 583 days.

(21) Appl. No.: 17/276,184

(22) PCT Filed: Sep. 13, 2019

(86) PCT No.: PCT/IB2019/057738
§ 371 (c)(1),
(2) Date: Mar. 15, 2021

(87) PCT Pub. No.: WO2020/053828
PCT Pub. Date: Mar. 19, 2020

(65) Prior Publication Data
US 2022/0043398 A1 Feb. 10, 2022

Related U.S. Application Data

(60) Provisional application No. 62/730,854, filed on Sep. 13, 2018.

(51) Int. Cl.
*F03G 5/06* (2006.01)
*F03G 1/02* (2006.01)
*F03G 7/06* (2006.01)
*F03G 7/08* (2006.01)
*G04B 1/26* (2006.01)
*G04B 5/22* (2006.01)

(52) U.S. Cl.
CPC ............ *F03G 5/065* (2021.08); *F03G 1/029* (2021.08); *F03G 7/06112* (2021.08); *F03G 7/06113* (2021.08); *F03G 7/06145* (2021.08); *F03G 7/0641* (2021.08); *F03G 7/085* (2021.08); *G04B 1/26* (2013.01); *G04B 5/22* (2013.01)

(58) Field of Classification Search
CPC .. G04B 1/26; G04B 5/22; F03G 7/085; F03G 7/06112
See application file for complete search history.

(56) References Cited

U.S. PATENT DOCUMENTS 2,749,700 A * 6/1956 Seligman ................. G04B 1/00
368/65
6,804,171 B2 * 10/2004 Miyazawa ........... H02K 7/1853
368/204

(Continued)

FOREIGN PATENT DOCUMENTS

EP 2725432 A1 4/2014
WO WO 2013/084057 A1 6/2013

OTHER PUBLICATIONS

International Search Report, International patent application No. PCT/IB2019/057738, dated Jan. 20, 2020.

*Primary Examiner* — Edwin A. Leon
*Assistant Examiner* — Jason M Collins
(74) *Attorney, Agent, or Firm* — Da Vinci Partners LLC; John Moetteli

(57) ABSTRACT

A system manages the reactions of fluids to their changes in their environment in order to convert these reactions into energy thereby harvesting the same while protecting the device against destruction or malfunction when the environmental conditions exceed predefined thresholds.

29 Claims, 10 Drawing Sheets

(56) References Cited

U.S. PATENT DOCUMENTS

| | | | | |
|---|---|---|---|---|
| 8,593,911 | B2* | 11/2013 | Grize | G04B 45/00 |
| | | | | 368/65 |
| 8,995,237 | B2* | 3/2015 | Vouillamoz | G04C 17/00 |
| | | | | 368/76 |
| 9,703,261 | B2* | 7/2017 | Vouillamoz | G04B 1/265 |
| 9,978,548 | B2* | 5/2018 | Rohner | H01H 29/00 |
| 10,481,555 | B2* | 11/2019 | Vouillamoz | G04B 27/00 |
| 2016/0033936 | A1 | 4/2016 | Jaccard et al. | |

* cited by examiner

ENERGY HARVESTING WITH FLUIDS

CROSS REFERENCE TO RELATED APPLICATIONS

This application is the National Stage of International Application No. PCT/IB2019/057738, filed Sep. 13, 2019, which claims benefit under 35 USC § 119(a), to U.S. provisional patent application Ser. No. 62/730,854, filed Sep. 13, 2018.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein is to be construed as an admission that the present invention is not entitled to antedate such material by virtue of prior invention.

BACKGROUND OF THE INVENTION

This invention relates to devices and methods harvesting energy freely available from the environment by means of liquids reacting to their environment's changes, such changes may be temperature variations, orientation variation relative to gravity, shocks, and/or radiation, among others.

Harvesting the energy freely available from the environment has encountered an increased interest over the recent years, in order to be able to power an increasing number of portable or wearable devices, as well as avoiding the need of electrical signal or power cables to remote actuation or sensing devices. The present invention relates to the harvesting of energy taking advantage of the reactions of fluids to their environment's changes, such changes maybe temperature variations, orientation variation relative to gravity, shocks, and/or radiation, among others.

SUMMARY OF THE INVENTION

The present invention provides means to manage the reactions of fluids to their environment changes in order to convert these reactions for energy harvesting while protecting the device against destruction or malfunction when the environmental conditions exceed predefined thresholds.

BRIEF DESCRIPTION OF THE DRAWINGS

The attached drawings represent, by way of example, different embodiments of the subject of the invention.

Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as it is exemplary in nature, serving to describe the best mode of the invention known to the inventors as of the filing date hereof. Consequently, changes may be made in the arrangement and/or function of any of the elements described in the exemplary embodiments disclosed herein without departing from the spirit and scope of the invention.

Figure 1A:
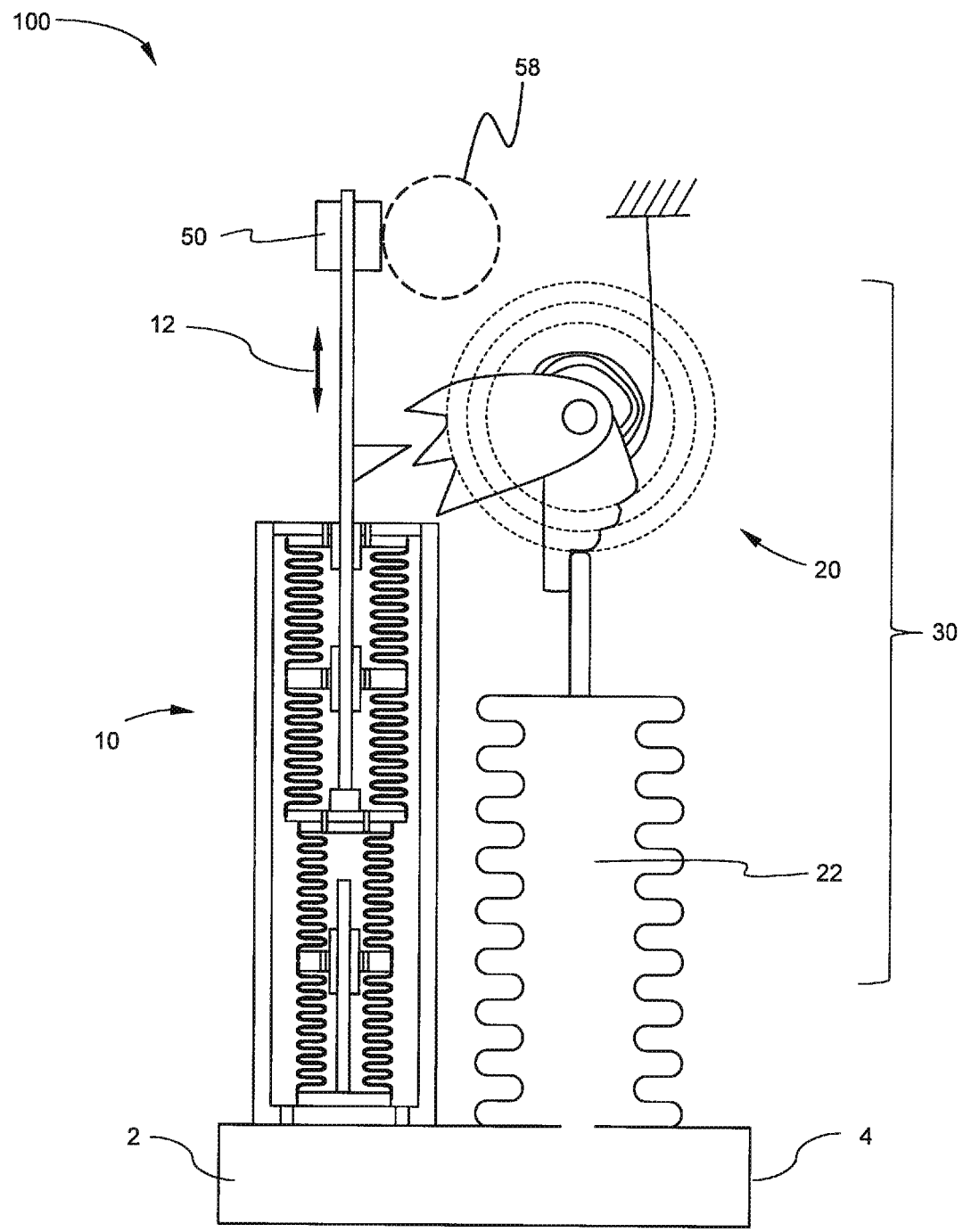
FIG. 1A-1G are views of a preferred embodiment of the invention

In an embodiment shown in FIG. 1A, energy harvesting with fluids is shown. The energy harvesting system 100 consists of a fluid 2 contained within a rigid reservoir 4 and a temperature range setting system 30. The reservoir is in fluid communication with a piston system 10 that converts variations of the volume of the fluid 2 into a mechanical motion. The temperature range setting system 30 is made of (a) a flexible chamber 22 and (b) a range setting mechanism 20 that ensures the energy conversion is efficient within the working temperature range and that protects the system against under/overpressure when outside the working temperature range. The mechanical motion produced by the piston system 10 is transformed into the appropriate motion via a transmission 50 as well known in the micromechanics industry so as to be stored in the form of mechanical energy, for example by compressing or expanding a spring, by winding a barrel spring, bending a flexural beam spring (not shown), a rack and pinion, or used directly to generate electricity via a dynamo 58 or to animate mechanical functions in a wearable device such as a wrist or pocket watch or handbag. In one variant, the energy harvesting system operates in one direction only, in which case the mechanical motion produced by the piston system 10 may be used mainly when temperature increases, the temperature decreases being used for adjusting the temperature range setting system 30, because the maximum available pressure needed to retract the bellows comes mainly from the environment and their own stiffness, This variant provides a solution for a simple energy storage mechanism, for example winding a barrel spring via the transmission 50. In another variant, the piston system 10 may include one or more preloading springs, allowing for the use of the mechanical motion produced by the piston system 10 both when temperature increases and when temperature decreases. For the mechanical storage of energy, this variant requires a more complex transmission mechanism 50, including a mechanical direction inverter which may add mechanical play and losses, in order to wind a barrel spring such as well-known in the watch industry. For other uses such as rotating a bidirectional dynamo, this variant may be more efficient.

The fluid 2 is a liquid, a colloidal liquid, a gas, or any combination or mixture of such elements in any number, and may include solid elements such as particles, lattice structures, ballast weights or agitators, engineered so as to be reactive to the changes of its environment, such changes maybe temperature variations, orientation variation relative to gravity, shocks, and/or radiation, among others. The fluid 2 may be selected to present abrupt variations of solubility of one or more of its components, or produce reversible chemical reactions upon reaching temperature thresholds within the system's working range. The fluid 2 is selected and/or engineered so as to present a combination of compressibility and thermal expansion characteristics that is optimized for the energy harvesting system and described herein according to various embodiments.

Figure 1B:
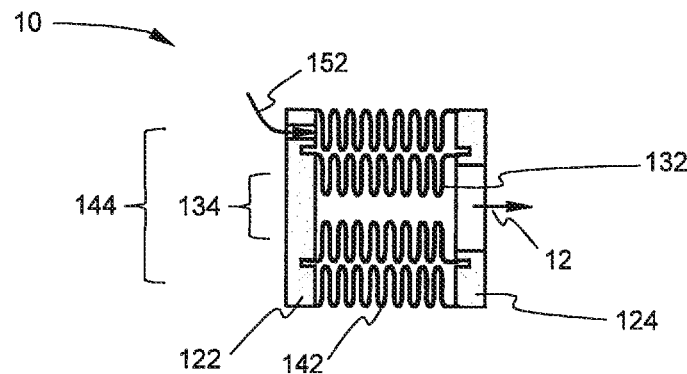
Figure 1C:
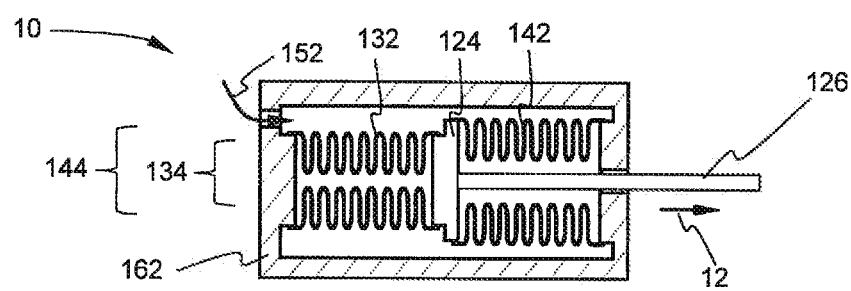

Referring now to FIG. 1B-C, the piston system 10 needs to be very efficient in converting fluid volume change into mechanical motion, and, to be installed in a wearable, the system has to be built as compact as possible. Bellows 132, 136, 142, and 146 offer the functionality of a piston together with very high fluid-tightness, but have a significant footprint due to the space used by the corrugations forming their flexible sidewalls. In addition, their stiffness is directly related to the size of said corrugations. In order to obtain a relatively long motion 12 for a relatively low fluid volume difference 152, a small working surface is preferred. Optimized construction may be found for a particular application with a focus on obtaining a relatively wide system for a short length, or a narrow body for a longer length.

Referring now to FIG. 1B, a design of the piston system 10 optimized for short length is obtained by installing a small bellows 132 with a small active surface 134 inside of a large bellows 142 with a larger active surface 144, and then attaching them together tightly to a base 122. Then the volume between both bellows 132, 142 can be used as a piston. The mobile part 124, attached tightly to both bellows 132, 142, presents a resulting active surface for the conversion of fluid volume variation 152 to motion 12 which is smaller than the active surface of the large piston 142, because it is the difference between the larger active surface 144 and the small active surface 134.

Referring now to FIG. 1C, a piston system 10 construction optimized for a narrow body is obtained by installing a small bellows 132 with a small active surface 134 in front of a large bellows 142 with a larger active surface 144, and attaching them together tightly to a mobile part 124 which transmits the mechanical motion 12 via a rod 126. The other ends of the bellows 132, 142 are tightly attached within the system's body 162. The volume between the inside of the system's body 162 and the bellows 132, 142 receives the fluid and acts as a piston, with an active surface used for the conversion of fluid volume variation 152 to motion 12 which is smaller than the active surface of the large piston 142. This is because it is the difference between the larger active surface 144 and the small active surface 134. Such a construction is preferred when the target is to reach a very small resulting active surface, because it allows the small bellows 132 and the large bellows 142 to have nearly the same size.

Figure 1D:
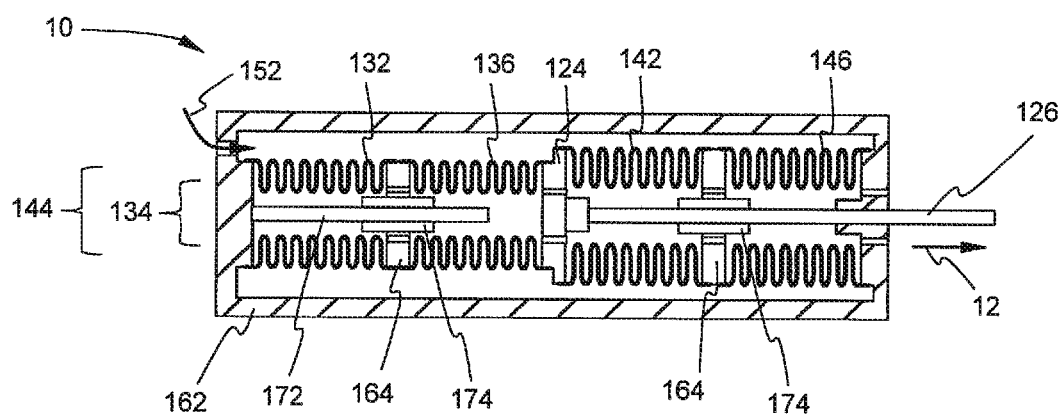

Referring now to FIG. 1D, a construction of the piston system 10 optimized for a narrow body may present the risk of bellows buckling, because the inside pressure may rise in combination with the small resulting active surface and the long mechanical motion 12 compared to the bellows' length. A solution involves splitting the small bellows 132 and large bellows 142 into two or more pieces, respectively bellows 136, 146. This allows the insertion of mobile junction elements 164 that rigidify the bellows transversally to their extension direction and provide guiding to ensure straight motion via rods 172 and guides 174. Friction between the guiding elements 172, 174 must be minimized in order to maximize the amount of energy converted into motion. Such construction including junction elements that rigidify the bellows transversally to their extension direction may also be used for the realization of a non-straight piston system, for example for following the circumference or radius of integration within a round device.

Figure 1E:
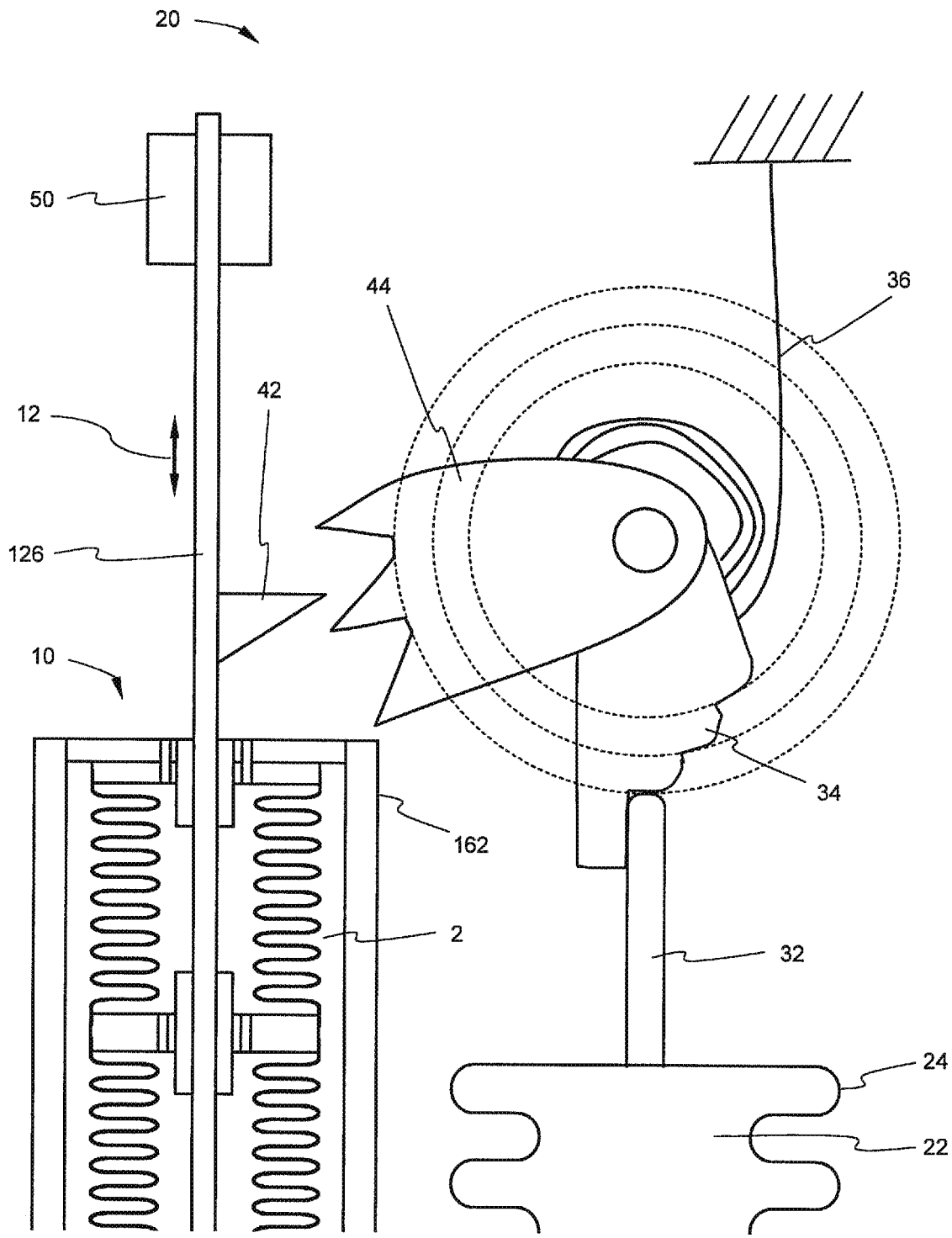

Referring now to FIG. 1E, the range setting mechanism 20 is built, for example, as a combination of cams, followers, levers, springs, lockers, and/or triggers, as well known in the industry. The flexible chamber 22 is realized as a bellows 24, limited in its expansion by a follower 32 resting on a range setting cam 34, such range setting cam being maintained in position by a combination of its own shape, the shape of the follower 32, a guiding mechanism (not shown) and a spiral or torsion spring 36 which provides a preload torque. The interface between the follower 32 and the range setting cam may be a simple mechanical contact, but in any case, the friction needs to be well controlled so that the rotation of the range setting cam remains possible even under pressure and so that the switching threshold is well defined. A good way to control such friction is the use of a roller that could be placed into a grooved feature. The range setting cam 34 has several positions with different height-forming steps, so as to define several filling levels of the flexible chamber 22. The filling levels correspond to a total volume of fluid 2 in the energy harvesting system 100. The switching points between different filling levels are designed to deal with the pressure limits for the range setting cam 34 so as to rotate under the action of the finger 42 on the secondary cam 44. The total volume of fluid 2 corresponds to a temperature of the fluid 2. Except when the temperatures are very low (in such case and the fluid may contract more than the system's minimum volume and evaporation may happen), at least in the anticipated working temperature range, the volume of fluid 2 should match the inside volume of the system 100.

As long as the flexible chamber 22 is limited in its expansion by the follower 32 resting on the range setting cam 34, the flexible chamber behaves like a rigid chamber, and any increase of volume of fluid 2 is transformed in mechanical expansion motion by the piston system 10. If the temperature of the fluid 2 increases, the volume of the fluid 2 increases, and such volume increase is transformed into mechanical expansion motion 12 by the piston system 10. If the temperature of the fluid 2 increases until the mechanical motion 12 reaches close to its maximal height, a finger 42 attached to the piston system's shaft 126 triggers a rotation of the range setting cam 34, either directly or via secondary cam 44 and/or levers (not shown). With the rigidities of the piston system 10 and the rigidity of the flexible chamber 22 carefully selected, together with optional preloading springs, the flexible chamber 22 expands until it reaches the next volume step as defined by the range setting cam 34. From that point, the flexible chamber 22 behaves like a rigid chamber. Any further increase of volume of fluid 2 is transformed into mechanical motion by the piston system 10. When the temperature of the fluid 2 decreases, the volume of the fluid 2 decreases, and any decrease of volume of fluid 2 is transformed into mechanical retraction motion by the piston system 10 and the flexible chamber 22, proportionally to their relative stiffnesses and active surfaces. If the temperature of the fluid 2 decreases until the mechanical motion 12 reaches its minimal height defined by a hard stop, for example, the finger 42 touching the body of the piston system 162, the further contraction of the fluid 2 is fully transferred in a contraction of the flexible chamber 22. The angular preload of the range setting cam 34 provided by the torsion spring 36 ensures that the range setting cam 34 follows the retraction of the flexible chamber 22, and presents the nearest cam step in front of the follower 32 so that the system can work again as soon as the temperature of the fluid 2 increases again.

Figure 1F:
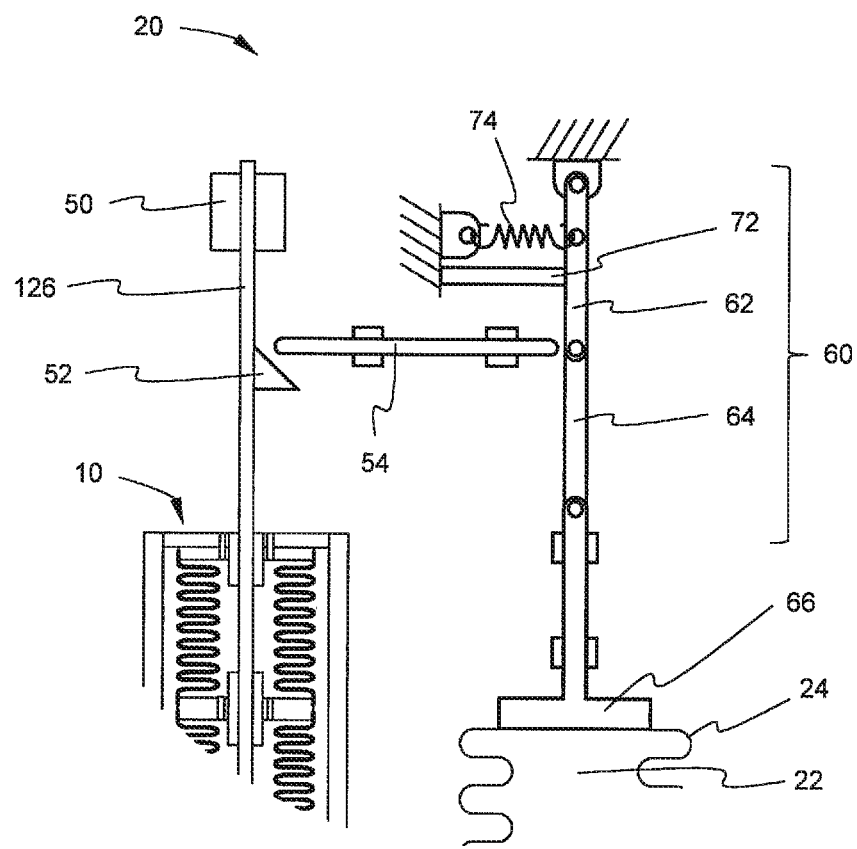
Figure 1G:
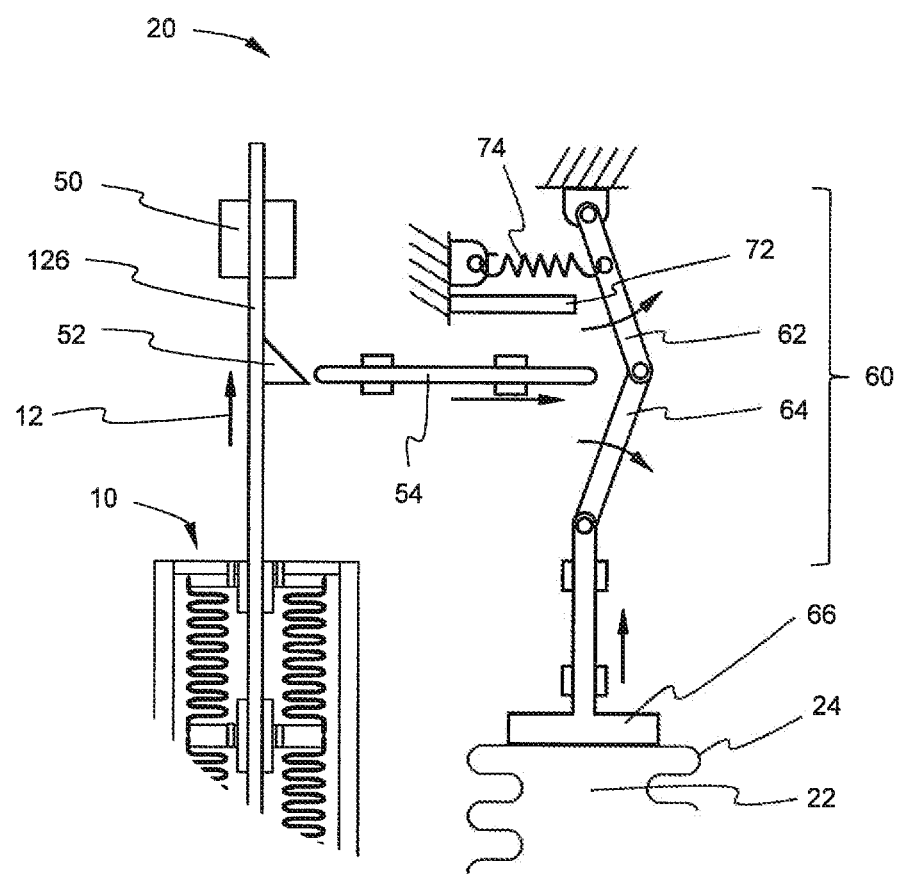

Referring now to FIG. 1F-G, the range setting mechanism 20 is built^, for example, as a combination of cams, followers, levers, springs, lockers, and/or triggers as well known in the micromechanics industry. The flexible chamber 22 is realized as a bellows 24, limited in its expansion by a stopper plate 66, which is connected to knee levers 62, 64 attached together and to the structure by pivots, forming a knee lever mechanism 60. During normal operation of the energy harvesting system 100, the knee levers 62, 64 are maintained in extended position by a spring 74 and a stopper 72, providing a rigid fixture for the bellows stopper plate 66, so that a maximum efficiency for the piston system 10 to transform fluid 2 volume variations into mechanical motion 12 is provided. If the fluid 2 temperature increases beyond a predefined threshold, the piston system's shaft 126 triggers an offset of the knee levers 62, 64. This may be done via a cam 52 attached to the piston system's shaft 126 pushing on the knee levers 62, 64 via a sliding finger 54, or by any other mechanical transmission system well known in the micromechanics industry. As soon as the knee levers 62, 64 are offset from their extended position, the rigidity of the fixture for the bellows stopper plate 66 drops, allowing the flexible chamber 22 to extend and avoid overpressure in the system. As soon as the temperature decreases below the predefined threshold, the spring 74 brings the knee levers 62, 64 back into position, and the flexible chamber is again made rigid by its stopper plate 66.

More than one such knee lever mechanisms 60 may be used in parallel, each mechanism 60 having a different extended length and activated in sequence, so as to provide several efficient working ranges and a safety threshold to avoid overpressure in the system 100. In such case, the sequencing of the several ranges may be ensured by, for example, a combination of cams, followers, levers, springs, lockers, and/or triggers, well known in the micromechanics industry.

Figure 2A:
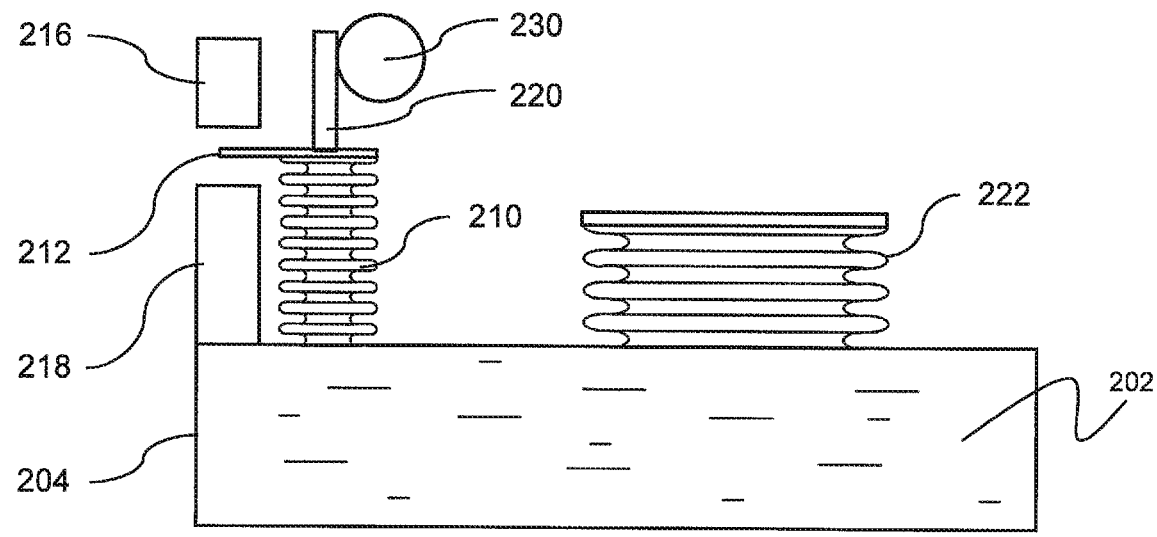
FIG. 2A-2C are views of another embodiment of the invention

In an embodiment shown in FIG. 2A, a fluid 202 is contained in a rigid reservoir 204, the reservoir 204 being in fluid communication with a main bellows 210 and a security bellows 222. The main bellows 210 is dimensioned to have a lower stiffness than the stiffness of the security bellows 222. Therefore, volume variations of the fluid 202 in reaction to environment changes are translated in a proportion inverse to the stiffness ratio of the bellows 210, 222 and their effective surfaces. The main bellows 210 is attached to a blocking arm 212 and to a mechanical transmission arm 220 which mobilizes a transmission system 230. In case of volume increase of the fluid 202 beyond a maximal allowed extension of the main bellows 210, overextension of the main bellows 210 is avoided by the blocking arm 212 reaching an upper stop 216. As the main bellows 210 cannot extend any further, all volume increase is transferred to the security bellows 222. Compared to a chamber system without security bellows 222, the pressure increase per temperature increment is strongly reduced thanks to the presence of the security bellows 222. In the same way, when a fluid volume contraction happens, over compression of the main bellows 222 is avoided by the blocking arm 212 reaching a lower stop 218. The security bellows 222 absorbs the remaining fluid volume decrease. Alternatively, if the liquid pressure becomes sufficiently low, the fluid 202 in liquid phase may vaporize, making the fluid compliant by the formation of a gas phase, limiting the pressure decrease and protecting the system from low temperature damage. The system depicted here is simple to build, and suffers from a loss of efficiency due to the security bellows 222, which is constantly absorbing a part of the fluid's volume variations in a proportion defined by the stiffness ratio of the bellows 210, 222 and their effective areas.

Figure 2B:
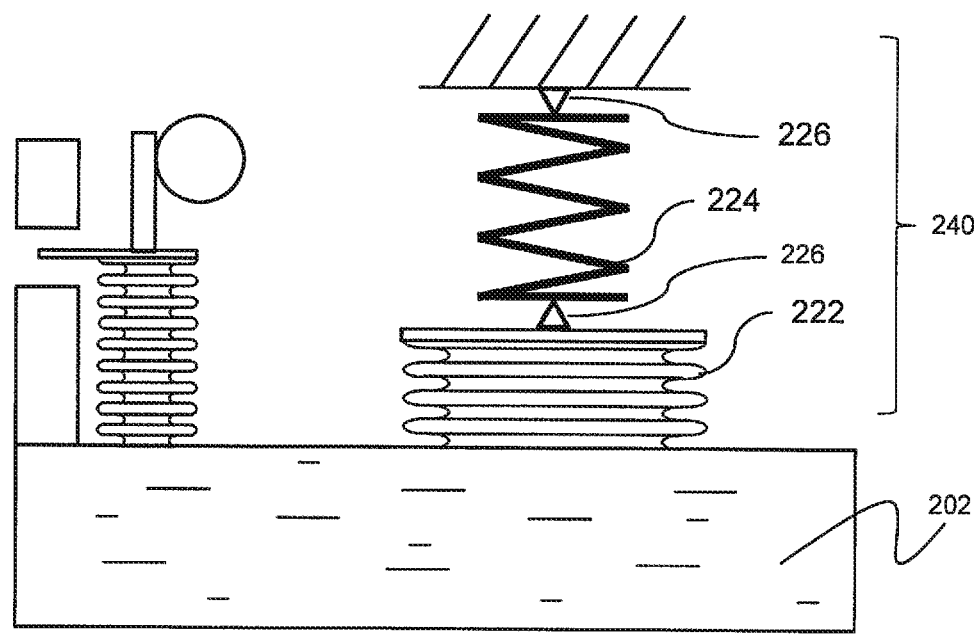
Figure 2C:
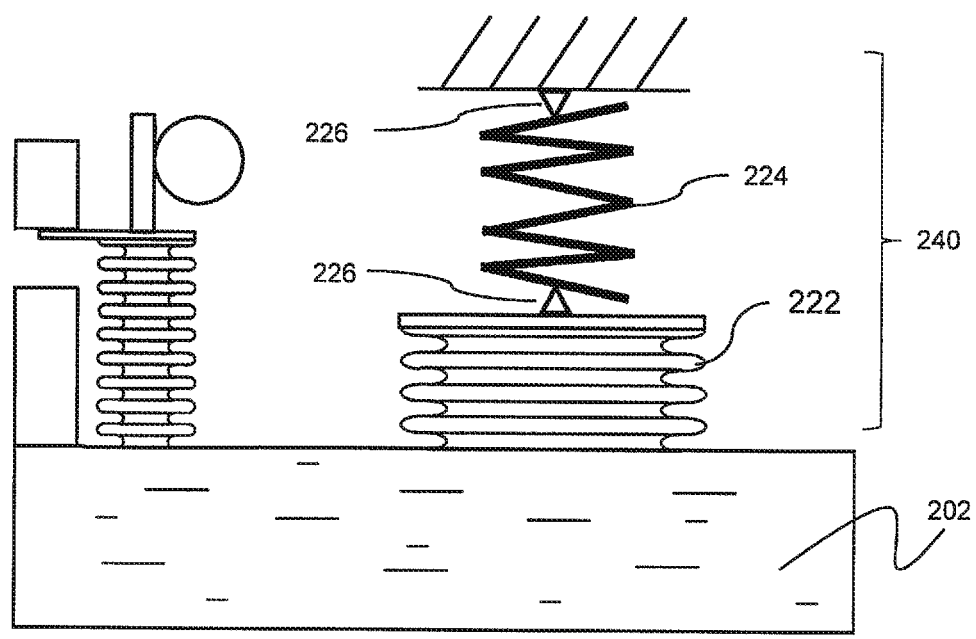

Referring now to FIG. 2B-C, an improvement of the system's efficiency may be obtained by modifying the usually linear stiffness behavior of the security bellows 222, by adding a non-linear rigidity system. Such non-linear rigidity system may take the form of a knee lever mechanism as described above, or any other usually known system in the industry, or as depicted here, as a compression spring 224 installed on pivots 226. As long as the temperature of the fluid 222 remains in the working range of the system (FIG. 2B) the blocking arm 212 doesn't touch the upper stop 216, the rigidity of the security bellows 222 is increased by the addition of the compression spring 224, increasing the efficiency of the system. The buckling rigidity of the compression spring 224 is selected so that if the temperature of the fluid 222 increases beyond a maximal allowed extension of the main bellows 210 (FIG. 2C), then the blocking arm 212 reaches the upper stop 216, increasing the sensitivity of the pressure increase of the fluid 222 to a temperature unit, resulting in a rapid force increase on the compression spring 224, provoking the buckling of the compression spring 224. When the compression spring buckles its rigidity drops and the global rigidity of the combination of the security bellows 222 and the compression spring 224 drops to nearly only the rigidity of the security bellows 222, ensuring the protection of the system.

Figure 3A:
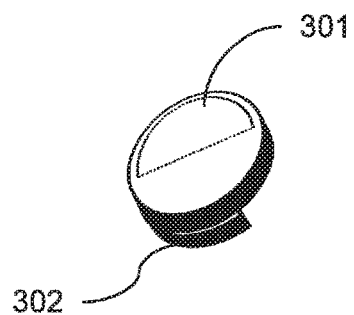
FIGS. 3A-3D are views of an optional feature that can be added to any embodiment of the invention.
Figures 3B, 3C, 3D:
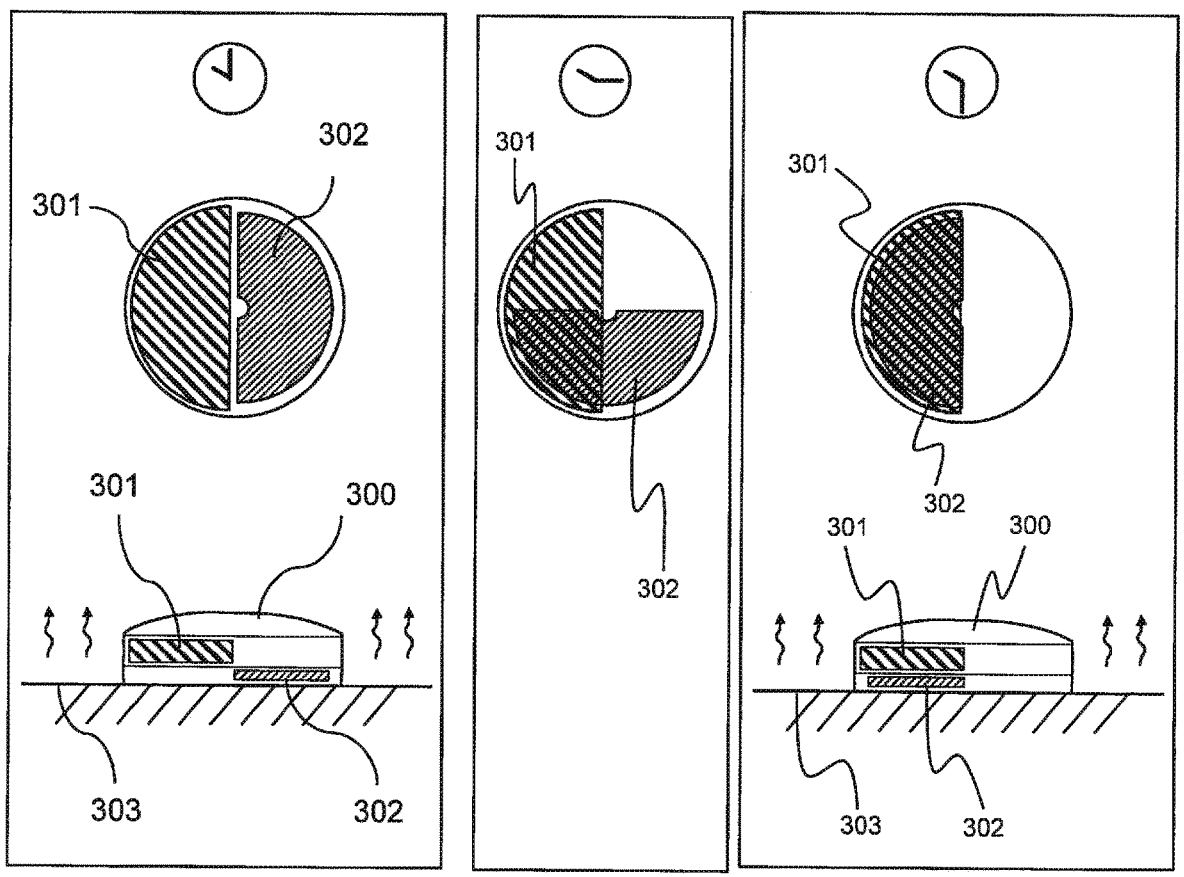

Referring now to FIG. 3A, an optional variable heat exchanger can be added to any of the herein disclosed and described embodiments of the present invention to reinforce the sensitivity of the system to temperature variations. A fluid reservoir 301 contains a fluid sensitive to temperature variations, and of which volume variations are transformed into mechanical motion as described in the other embodiments. Part of such produced mechanical energy is used to move a heat exchanger 302 so that the thermal conductivity between the environment and the fluid reservoir 301 has regular variations. The frequency at which the heat exchanger body passes close to the reservoir 301 has to be set according to the thermal dynamics of the system. For example, if the variable heat exchanger is used in a wall clock or wristwatch, the heat exchanger 302 may be rotating at the same speed as the minute hand, the hour hand, or any other relatively slow-moving part of the watch mechanism. Referring to FIG. 3B, 3C, 3D, a main heat source 303 is the wrist of the wearer. At the beginning of a cycle, as shown in FIG. 3B, the heat exchanger 302 is not disposed on the thermal path between a heat source 303 and the fluid reservoir 301. In this way, the temperature of the fluid reservoir 301 evolves towards the ambient temperature. As shown in FIG. 3C, after a quarter of a cycle, the heat exchanger 302 is half engaged between the heat source 303 and the fluid reservoir 301, favoring the heat path from the heat source 303 to the fluid reservoir 301. As shown in FIG. 3D, after half of a cycle, the heat exchanger 302 is totally engaged between the heat source 303 and the fluid reservoir 301 and consequently the temperature of the fluid reservoir 301 is approaching the heat source 303 temperature. After a further quarter of a cycle, the heat exchanger 302 is half disengaged from the thermal path between heat source 303 and fluid reservoir 302 and the temperature of the fluid reservoir 302 approaches the ambient temperature. For the best functioning of the system, the heat exchanger 302 must have a low heat capacity and a high conduction. As vacuum or a gas barrier are good thermal insulators, the variable heat exchanger may also be realized as an empty container rotating within a reservoir containing one or more fluids of high thermal conductivity.

Figure 4:
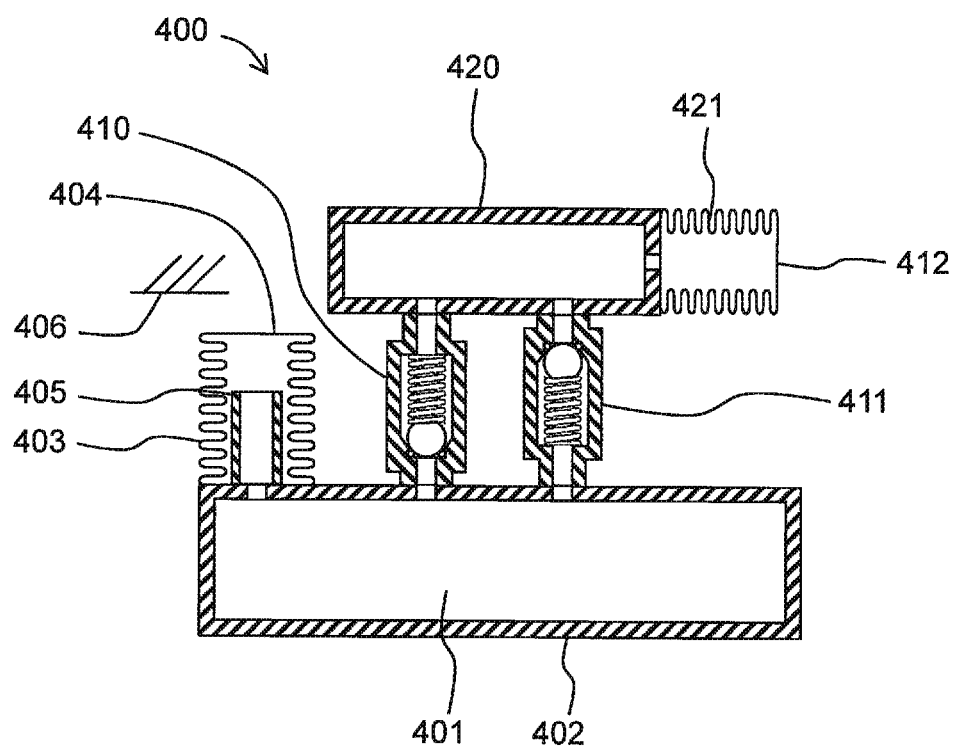
FIG. 4 is a cut view of still another embodiment of the invention.
Figure 5:
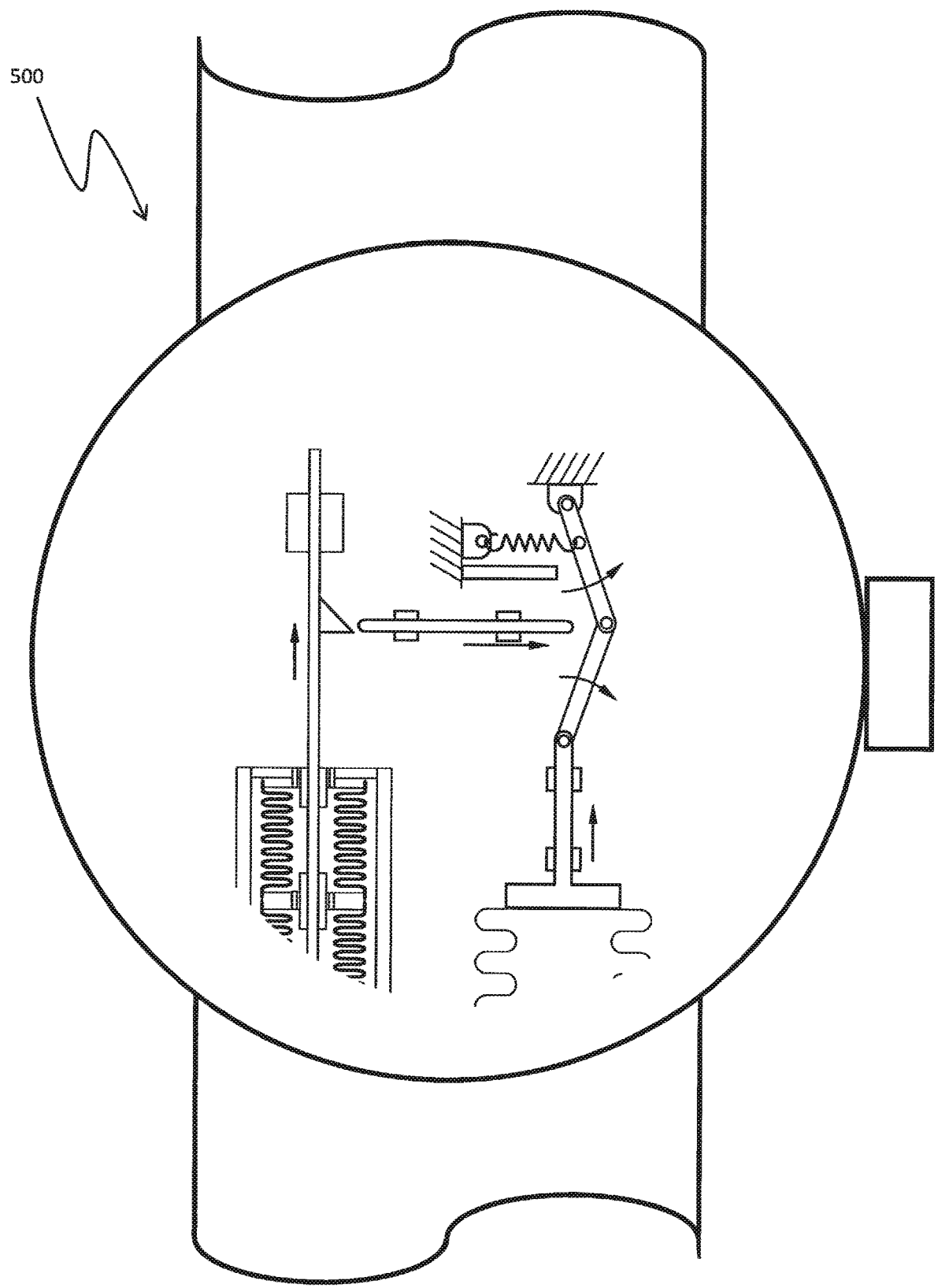
FIG. 5 is a schematic view of a wearable device integrating the invention.

In an embodiment shown in FIG. 4, a fluid 401 is contained in a main container 402. The main container 402 is in fluidic communication with a main bellows 403 and a secondary container 420 through at least two check valves 410, 411 arranged in opposite directions. The variations of the volume of the fluid 401 in reaction to the variations of its environment, i.e. the environment surrounding the embodiment 400 are transformed into a motion of a mobile face 404 of the main bellows 403. Such motion may be used by way of a mechanical system for the rewinding of mechanical energy storage system, or turned into electricity by means of a generator system, or used for triggering the action of any subsequent system (not shown here). The main bellows 403 is protected from over compression by a mechanical stop 405 and from overextension by another mechanical stop 406. As the temperature increases, the main bellows 403 expands until reaching the mechanical stop 406. In case of further temperature increase, the pressure rapidly increases inside the main container 402 threatening to exceed the maximal pressure limit of the system 400. The pressure release check valve 410 will then open the fluidic communication to the secondary container 420, releasing the pressure in chamber 402. The opening pressure of the release check valve 410 has to be selected so that it opens before a pressure increase would exceed the resistance of the container 402 and bellows 403. The secondary container 420 is connected to a secondary bellows 421 to accommodate the pressure release in order to avoid damages to the system 400. The bellows 421 may be pre-loaded in a similar manner as bellows 222 of FIGS. 2B-2C with a linear or non-linear spring similar to 224 and fixtures similar to 226, or a range setting mechanism such as described in FIGS. 1E-1G. After such activation of the release check valve 410, the working range of the main bellows 403 is shifted towards a higher total fluid volume, as the bellows 403 moves away from the mechanical stop 406 and is able to harvest more energy if the temperature continues to increase. If the temperature of the whole system goes down, the pressure in the chamber 420 will drop slower than the pressure in the chamber 402, provided the volume of the chamber 420 is smaller than the volume of the chamber 402. Therefore, an automatic restoring of the system to its original working range is obtained when the pressure difference between container 420 and the main container 402 reaches the opening pressure of check valve 411. Alternatively, the reset could be triggered upon user request by applying an external reset force on the surface 412 of the secondary bellows 421 to reach the opening pressure of the valve 411. As long as the pressure difference between the secondary container 420 and the main container 402 is higher than closing pressure of the reset check valve 411, the fluid 401 flows through the reset check valve 411 until a lower pressure is restored in the main container 402. When used in a timepiece or other high precision instrument, careful design of the system is necessary to set its working range where maximal reaction to environmental changes are obtained.

Because in practice, Applicant cannot know the state of the art, the invention here claimed should be interpreted as any combination of functionally independent elements that are later revealed through examination to be novel and inventive.

All the embodiments described here above also apply when the fluid is made of a combination of at least one liquid and at least one gas dissolved in said fluid. The liquid may also contain solid particles, colorants, dyes, salts, or any other dissolved material. The fluid may also contain parts of the same material at different physical state, such as solid, liquid and or gas. In such case, the volumetric variations of the fluid may be increased by the combination of several reactions of the fluids to their environmental conditions variations. For example, shocks and vibrations may trigger the release of dissolved gas out of the liquid; radiation may trigger chemical reactions between the components of the fluids, temperature changes may lead to change of phase equilibria between different physical states of the material (s), temperature changes may lead to changes of chemical equilibrium between different fluids, among other effects.

Depending on the intended use for the device integrating the system of the present invention, reversible or irreversible reactions may be used.

Radiation such as the natural ultraviolet light provided by the sun or certain types of lighting maybe used to trigger chemical reactions, in such case at least a part of the fluid containers may be built out of UV-transparent material.

Incorporated by reference herein, and relied upon is the content of U.S. Pat. No. 10,031,481, filed on Mar. 17, 2014, titled "Temperature driven winding system".

It should be appreciated that the particular implementations shown and herein described are representative of the invention and its best mode and are not intended to limit the scope of the present invention in any way.

The invention may be summarized as comprising the following features sets:

1. An energy harvesting system (100) comprising a rigid reservoir (4, 204), a piston system (10), and a temperature range setting system (30), the energy harvesting system (100) containing a fluid (2), said reservoir in fluid communication with:
   (a) the piston system (10) that converts variations of the volume of said fluid into a mechanical motion, and
   (b) the temperature range setting system (30) including at least a flexible chamber (22) and a range setting mechanism (20), wherein the flexible chamber (22) is connected to the range setting mechanism (20) so as to engage motion of the piston system (10) within a given temperature range, thereby managing the reactions of fluids to their environment changes in order to convert these reactions to harvest energy while protecting the device against destruction or malfunction when the environmental conditions exceed predefined thresholds, thereby automatically ensuring that energy conversion is efficient within the working temperature range and protecting the system against under/over-pressure when outside the working temperature range.

2. The system according to feature set 1, wherein the piston system (10) comprises a bellows (132, 136, 142, 146).

3. The system according to feature set 1, wherein the piston system (10) comprises at least two bellows (132, 136, 142, 146) with different active surfaces, arranged so that the resulting effective surface of the piston system is the difference of the active surfaces of the at least two bellows.

4. The system according to feature set 1, wherein the at least two bellows (132, 136, 142, 146) are concentric.

5. The system according to feature set 1, wherein mechanical motion produced by the piston system (10) is then stored in the form of potential mechanical energy.

6. The system according to feature set 5, wherein the potential mechanical energy is stored by compressing or expanding a spring (36).

7. The system according to feature set 5, wherein the potential mechanical energy is stored by winding a barrel spring (74) or bending a flexural beam spring (224).

8. The system according to any one of feature sets 1, 2, 3, or 4, wherein the mechanical energy is used directly to generate electricity via a dynamo (58) or to animate mechanical functions in a wearable device (500).

9. The system according to any one of the above feature sets, wherein the wearable device (500) is a timepiece (500).

10. The system according to any one of the above feature sets, wherein the flexible chamber (22) comprises a bellows (24) limited in its expansion by a follower (32) resting on a range setting cam (34), such range setting cam being maintained in a defined position.

11. The system according to feature set 10, wherein the defined position is maintained by a combination of its own shape, the shape of the follower (32) and a torsion spring (36) which provides a preload torque.

12. The system according to any one of feature sets 10 or 11, wherein an interface between the follower (32) and the range setting cam (34) is a simple mechanical contact.

13. The system according to any one of feature sets 10, 11 or 12, wherein friction is controlled so that the rotation of the range setting cam (34) remains possible even under pressure.

14. The system according to any one of the feature sets 10 to 13, wherein the range setting cam (34) has several positions with different height-forming steps, so as to define several filling levels of the flexible chamber (22).

15. The system according to feature set 14, wherein the filling levels correspond to a total volume of fluid (2) or predefined pressure thresholds of the chamber (22) in the energy harvesting system (100).

16. The system according to any of the above feature sets, wherein the total volume of fluid (2) corresponds to a temperature of the fluid (2) such that as long as the flexible chamber (22) is limited in its expansion by the follower (32) resting on the range setting cam (34), the flexible chamber (22) behaves like a rigid chamber, and any increase of volume of fluid (2) is transformed in mechanical expansion motion by the piston system (10).

17. The system according to any of the above feature sets, wherein if the temperature of the fluid (2) increases, the volume of the fluid (2) increases, and such volume increase is transformed by the piston system (10) into mechanical work by the expansion motion (12) of a shaft (126) submitted to the reaction force of the mechanism to be wound.

18. The system according to any one of the above feature sets, wherein if the temperature of the fluid (2) increases until the mechanical motion (12) approaches its maximal height, a finger (42) attached to the piston system's shaft (126) triggers a rotation of the range setting cam (34), either directly or via secondary device (44) such that, with the stiffness and surface of the piston system (10) and the stiffness and surface of the flexible chamber (22) carefully selected, together with optional preload springs and torsion spring (36), the flexible chamber expands until it reaches the next volume step as defined by the range setting cam (34), at which point the flexible chamber behaves like a rigid chamber.

19. The system according to feature set 18, wherein any further increase of volume of fluid (2) is transformed into mechanical motion by the piston system (10) such that when the temperature of the fluid (2) decreases, the volume of the fluid (2) decreases, and any decrease of volume of fluid (2) is transformed into mechanical retraction motion of the piston system (10) and of the flexible chamber (22).

20. The system according to feature set 19, wherein further, if the temperature of the fluid (2) decreases until the mechanical motion 12 reaches its minimal height defined by a hard stop, for example, the finger (42) touching the body of the piston system (162), the further contraction of the fluid (2) is fully transferred in a contraction of the flexible chamber (22).

21. The system according to any one of feature sets 17 or 18 wherein the hard stop is reached when the finger (42) touches the body of the piston system (162).

22. The system according to any one of the above feature sets, wherein the preload torque of the range setting cam (34) provided by the torsion spring (36) ensures that the range setting cam (34) follows the retraction of the flexible chamber (22), and presents the nearest cam step in front of the follower (32) so that the system returns to its prior volume range setting with lower volume of flexible chamber (22).

23. The system according to any one of the above feature sets, wherein the range setting mechanism (20) is built as a multiple knee lever mechanisms (60), the knee being offset by the finger (42) attached to the piston system (10) when the maximum position is reached, and reset by a spring as soon as the flexible chamber (22) retracts following a decrease of the temperature of the fluid (2).

24. The system according to any one of the above feature sets, wherein the fluid (2) is selected from one of the group of fluids comprising a liquid, a colloidal liquid, a gas, or any combination or mixture of such elements in any number.

25. The system according to any one of the above feature sets, wherein the fluid (2) includes solid elements engineered so as to be reactive to the changes of its environment selected from one of the group of solid elements consisting of particles, colorants, dyes, salts, any other dissolved material, lattice structures, ballast weights and agitators.

26. The system according to according to any one of the above feature set, wherein the temperature range setting system (30) is a flexible chamber (222), where the flexible chamber's stiffness is higher than the stiffness of the piston system.

27. The system according to feature set 26, wherein the temperature range setting system (30) is a flexible chamber (222), maintained in a first position when the ambient temperature is within the working range by a spring system with non-linear characteristic (224, 226), said spring system having an abrupt loss of stiffness when the temperature increases and the resulting pressure inside the system exceeds a predefined threshold, said spring system recovering its initial position when the temperature decreases and the resulting pressure inside the system decreases below a predefined threshold.

28. The system according to any one of the above feature sets, wherein a variable heat exchanger generates thermal conductivity variations between the fluid (2) and its environment.

29. The system according to any one of the above feature sets, wherein the temperature range setting system (30) is a flexible chamber (420, 421) connected to the main fluid reservoir (402) via passive safety valves.

As will be appreciated by skilled artisans, the present invention may be embodied as a system, a device, or a method.

Moreover, the system contemplates the use, sale and/or distribution of any goods, services or information having similar functionality described herein.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements such as those described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Additional features and functionality of the invention are described in the claims appended hereto and/or in the abstract. Such claims and/or abstract are hereby incorporated in their entirety by reference thereto in this specification and should be considered as part of the application as filed.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application.

What is claimed is:

1. An energy harvesting system comprising a rigid reservoir, a piston system, and a temperature range setting system, the energy harvesting system containing a fluid having a total volume, said reservoir in fluid communication with:
   (a) the piston system that converts variations of the volume of said fluid into a mechanical motion, and
   (b) the temperature range setting system including at least a flexible chamber and a range setting mechanism, wherein the flexible chamber is connected to the range setting mechanism so as to engage motion of the piston system within a given temperature range, thereby managing reactions of fluids to temperature changes in order to convert these reactions to harvest energy.

2. The energy harvesting system according to claim 1, wherein the piston system comprises a bellows.

3. The energy harvesting system according to claim 1, wherein the piston system comprises at least two bellows with different active surfaces, arranged so that a resulting effective surface of the piston system is a difference of the active surfaces of the at least two bellows.

4. The energy harvesting system according to claim 1, wherein the at least two bellows are concentric.

5. The energy harvesting system according to claim 1, wherein mechanical motion produced by the piston system is then stored in the form of potential mechanical energy.

6. The energy harvesting system according to claim 5, wherein the potential mechanical energy is stored by compressing or expanding a spring.

7. The energy harvesting system according to claim 5, wherein the potential mechanical energy is stored by winding a barrel spring or bending a flexural beam spring.

8. The energy harvesting system according to claim 1, wherein the mechanical energy is used directly to generate electricity via a dynamo or to animate mechanical functions in a wearable device.

9. The energy harvesting system according to claim 1, wherein the energy harvesting system is a timepiece.

10. The energy harvesting system according to claim 1, wherein the flexible chamber comprises a bellows limited in its expansion by a follower resting on a range setting cam, such range setting cam being maintained in a defined position.

11. The energy harvesting system according to claim 10 having a shape, wherein the defined position is maintained by a combination of the shape of the energy harvesting system, the shape of the follower and a torsion spring which provides a preload torque.

12. The energy harvesting system according to claim 10, wherein an interface between the follower and the range setting cam is a simple mechanical contact.

13. The energy harvesting system according to claim 10, wherein friction is controlled so that the rotation of the range setting cam remains possible even under pressure.

14. The energy harvesting system according to claim 10, wherein the range setting cam has several positions with different height-forming steps, so as to define several filling levels of the flexible chamber.

15. The energy harvesting system according to claim 14, wherein the filling levels correspond to the total volume of fluid or predefined pressure thresholds of the chamber in the energy harvesting system.

16. The energy harvesting system according to claim 1, wherein the total volume of fluid corresponds to a temperature of the fluid such that as long as the flexible chamber is limited in its expansion by a follower resting on a range setting cam, the flexible chamber behaves like a rigid chamber, and any increase of volume of fluid is transformed in mechanical expansion motion by the piston system.

17. The energy harvesting system according to claim 1, wherein if the temperature of the fluid increases, the volume of the fluid increases, and such volume increase is transformable by the piston system into mechanical work.

18. The energy harvesting system according to claim 1, wherein if the temperature of the fluid increases until the mechanical motion approaches its maximal height, a finger attached to a shaft of the piston system triggers a rotation of a range setting cam, either directly or via secondary device such that the flexible chamber expands until it reaches a next volume step as defined by the range setting cam, at which point the flexible chamber behaves like a rigid chamber.

19. The energy harvesting system according to claim 18, wherein any further increase of volume of fluid is transformed into mechanical motion by the piston system such that when the temperature of the fluid decreases, the volume of the fluid decreases, and any decrease in volume of fluid is transformed into mechanical retraction motion of the piston system and of the flexible chamber.

20. The energy harvesting system according to claim 19, wherein further, if the temperature of the fluid decreases until the mechanical motion reaches its minimal height, further contraction of the fluid is adapted to be fully transferred in a contraction of the flexible chamber.

21. The energy harvesting system according to claim 17 wherein a hard stop is reached when the finger touches a body of the piston system.

22. The energy harvesting system according to claim 19, wherein a characteristic preload torque of a range setting cam provided by a torsion spring ensures that a range setting cam follows the retraction of the flexible chamber, and presents the nearest cam step in front of a follower so that the temperature range setting system returns to its prior volume range setting with a lower volume of flexible chamber.

23. The energy harvesting system according to claim 1, wherein the range setting mechanism is built as a multiple knee lever mechanisms having a knee, the knee being offset by a finger attached to the piston system when a maximum position is reached, and reset by a spring as soon as the flexible chamber retracts following a decrease of the temperature of the fluid.

24. The energy harvesting system according to claim 1, wherein the fluid is selected from one of the group of fluids comprising a liquid, a colloidal liquid, a gas, or any combination or mixture of such elements in any number.

25. The energy harvesting system claim 1, wherein the fluid includes solid elements engineered so as to be reactive to the changes of its environment selected from one of the group of solid elements consisting of particles, colorants, dyes, salts, dissolved materials, lattice structures, ballast weights and agitators.

26. The energy harvesting system according to according to claim 1, wherein the temperature range setting system is a flexible chamber, where the flexible chamber's stiffness is higher than a characteristic stiffness of the piston system.

27. The energy harvesting system to claim 26, wherein the temperature range setting system is a flexible chamber, maintained in a first position when the ambient temperature is within the working range by a spring system with non-linear characteristic, said spring system having an abrupt loss of stiffness when the temperature increases and the resulting pressure inside the energy harvesting system exceeds a predefined threshold, said spring system recovering its initial position when the temperature decreases and the resulting pressure inside the energy harvesting system decreases below a predefined threshold.

28. The energy harvesting system according to claim 1, wherein a variable heat exchanger generates thermal conductivity variations between the fluid and its environment.

29. The energy harvesting system according to claim 1, wherein the temperature range setting system is a flexible chamber connected to a main fluid reservoir via passive safety valves.

* * * * *

UNITED STATES PATENT AND TRADEMARK OFFICE
CERTIFICATE OF CORRECTION

| | | |
|---|---|---|
| PATENT NO. | : 12,006,919 B2 | Page 1 of 1 |
| APPLICATION NO. | : 17/276184 | |
| DATED | : June 11, 2024 | |
| INVENTOR(S) | : Alain Jaccard, Johann Rohner and Luc Maffli | |

It is certified that error appears in the above-identified patent and that said Letters Patent is hereby corrected as shown below:

In the Claims

- Claim 25: please replace the phrase "The energy harvesting system claim 1,..." with the phrase "The energy harvesting system according to claim 1".

- Claim 26: please replace the phrase "The energy harvesting system according to according to claim 1" with the phrase "The energy harvesting system according to claim 1".

Signed and Sealed this
Twenty-third Day of July, 2024

Katherine Kelly Vidal
*Director of the United States Patent and Trademark Office*